United States Patent
Diard

(10) Patent No.: US 9,830,288 B2
(45) Date of Patent: *Nov. 28, 2017

(54) SYSTEM AND METHOD FOR TRANSMITTING GRAPHICS RENDERED ON A PRIMARY COMPUTER TO A SECONDARY COMPUTER

(75) Inventor: Franck Diard, Saint-Contest (FR)

(73) Assignee: NVIDIA CORPORATION, Santa Clara, CA (US)

( * ) Notice: Subject to any disclaimer, the term of this patent is extended or adjusted under 35 U.S.C. 154(b) by 1311 days.

This patent is subject to a terminal disclaimer.

(21) Appl. No.: 13/329,994

(22) Filed: Dec. 19, 2011

(65) Prior Publication Data

US 2013/0159563 A1 Jun. 20, 2013

(51) Int. Cl.
*G06F 13/28* (2006.01)

(52) U.S. Cl.
CPC .................................. *G06F 13/28* (2013.01)

(58) Field of Classification Search
None
See application file for complete search history.

(56) References Cited

U.S. PATENT DOCUMENTS

| | | | |
|---|---|---|---|
| 6,591,279 B1 * | 7/2003 | Emens et al. | |
| 6,704,021 B1 * | 3/2004 | Rogers et al. | 345/543 |
| 6,708,217 B1 * | 3/2004 | Colson et al. | 709/231 |
| 6,714,200 B1 * | 3/2004 | Talnykin et al. | 345/473 |
| 7,173,635 B2 * | 2/2007 | Amann et al. | 345/660 |
| 2002/0065915 A1 * | 5/2002 | Anderson et al. | 709/225 |
| 2003/0142104 A1 * | 7/2003 | Lavelle | G06T 11/001 345/552 |
| 2006/0282855 A1 * | 12/2006 | Margulis | 725/43 |
| 2007/0038939 A1 * | 2/2007 | Challen et al. | 715/734 |
| 2007/0120874 A1 * | 5/2007 | MacInnis | G09G 5/001 345/634 |
| 2007/0245119 A1 * | 10/2007 | Hoppe | 711/216 |
| 2011/0063304 A1 * | 3/2011 | Diard | G06F 9/455 345/502 |
| 2011/0102588 A1 * | 5/2011 | Trundle et al. | 348/143 |
| 2011/0105226 A1 * | 5/2011 | Perlman | A63F 13/12 463/30 |
| 2013/0215266 A1 * | 8/2013 | Trundle et al. | 348/143 |
| 2014/0270722 A1 * | 9/2014 | Wang et al. | 386/355 |
| 2014/0333413 A1 * | 11/2014 | Kursun | 340/5.52 |

* cited by examiner

*Primary Examiner* — Henry Tsai
*Assistant Examiner* — Christopher Bartels
(74) *Attorney, Agent, or Firm* — Artegis Law Group, LLP

(57) ABSTRACT

One embodiment of the present invention sets forth a method for transmitting data rendered on a primary computer to a secondary computer. The method includes transmitting to GPU graphics processing commands received from a graphics application, where the graphics processing commands are configured to cause the GPU to render a first set of graphics data, determining that graphics data should be collected for transmission to the secondary computer, conveying to the GPU that the first set of graphics data should be stored in a first buffer within a frame buffer memory, transmitting to the GPU graphics processing commands received from a process application executing on the primary computer, where the graphics processing commands are configured to cause the GPU to perform operations on the first set of graphics data to generate a second set of graphics data, and transmitting the second set of graphics data to the secondary computer.

18 Claims, 8 Drawing Sheets

SYSTEM AND METHOD FOR TRANSMITTING GRAPHICS RENDERED ON A PRIMARY COMPUTER TO A SECONDARY COMPUTER

BACKGROUND OF THE INVENTION

Field of the Invention

The present invention relates generally to remote access, and, more specifically, to a system and method transmitting graphics rendered on a primary computer to a secondary computer.

Description of the Related Art

Desktop sharing technologies enable the remote access of a primary computer via graphical terminal that executes on a secondary computer. The graphical terminal allows a user of the secondary computer to view and access any applications executing on the primary computer. To enable the operations of the graphics terminal, a server process typically executes on the primary computer that collects graphics data related to applications executing on the primary computer and transmits the collected graphics data to the secondary computer.

There are several drawbacks to desktop sharing technologies that are currently available. First, when the secondary computer connects to the primary computer, applications executing on the primary computer typically encounter a negative side effects. For example, a gaming application executing on the primary computer may exit when the secondary computer connects to the primary computer. Importantly, current desktop sharing technologies do not provide a smooth transition to applications executing on the primary computer when a connection between the primary computer and the secondary computer is established. Second, because the display resolution at the primary computer and the display resolution at the secondary computer are often different, the graphical display of the primary computer may be modified to match the display resolution of the secondary computer. Matching the display resolutions in such a manner may adversely affect the graphics that are displayed at the primary computer and impact the overall display quality for any user viewing the graphics displayed at the primary computer. Third, current desktop sharing technologies consume a significant amount of processing bandwidth when collecting and transmitting graphics data to the secondary computer. This negatively impacts the overall performance of the primary computer, and, oftentimes, renders the primary computer unusable.

As the foregoing illustrates, what is needed in the art is a mechanism for remotely connecting to a primary computer that does not adversely impact the operation of the primary computer.

SUMMARY OF THE INVENTION

One embodiment of the present invention sets forth a method for transmitting data rendered on a primary computing device to a secondary computing device. The method includes the steps of transmitting to a graphics processing unit (GPU) included within the primary computing device a first graphics processing command received from a graphics application executing on the primary computing device, where the first graphics processing command is configured to cause the GPU to render a first set of graphics data, determining that graphics data should be collected for transmission to the secondary computing device, conveying to the GPU that the first set of graphics data should be stored in a first buffer within a frame buffer memory coupled to the GPU, transmitting to the GPU a second graphics processing command received from a process application executing on the primary computing device, where the second graphics processing command is configured to cause the GPU to perform one or more operations on the first set of graphics data stored in the first buffer to generate a second set of graphics data, and causing the GPU to transmit the second set of graphics data to a second buffer within a system memory coupled to the GPU for transmission to the secondary computing device.

Advantageously, the technique for collecting and transmitting graphics data to the secondary computer described herein allows for a smooth transition when the client process connects to or disconnects from the server process as the behavior of the primary computer and applications executing within the primary computer 102 are not modified. In addition, because the commands for generating and collecting graphics data and the commands for modifying the graphics data for transmission are transmitted to the GPU on different channels, the operation of graphics application is not slowed down or stalled by the operation of the server process. Lastly, because the GPU is able to perform a DMA operation to transfer graphics data to system memory, the performance of the server computer is not impacted based on such a transfer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
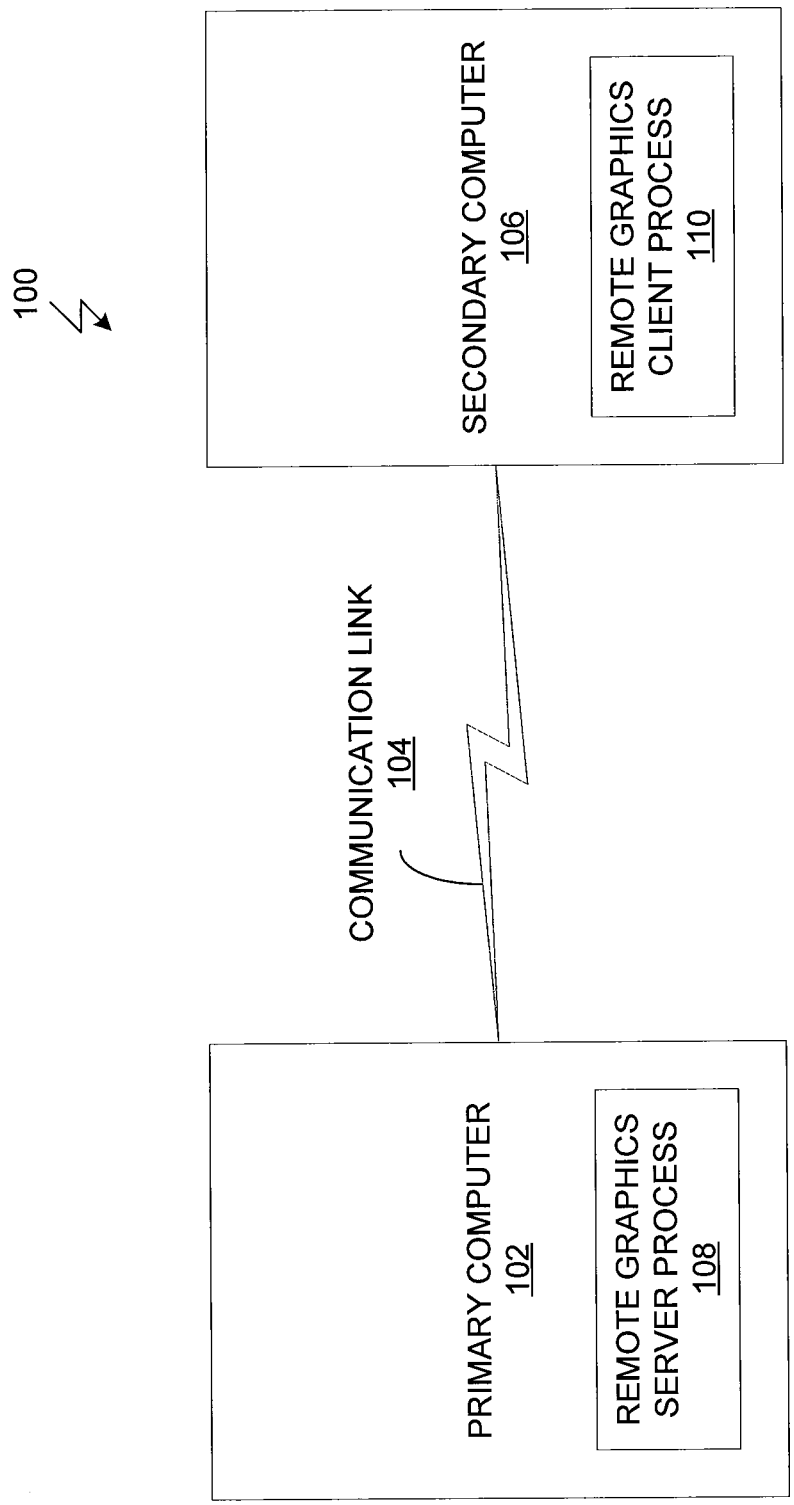
FIG. 1 illustrates a remote computing environment, according to one embodiment of the invention.

FIG. 1 illustrates a remote computing environment 100, according to one embodiment of the invention. As shown, the remote computing environment 100 includes a primary computer 102, a secondary computer 106 and a communications link 104.

The secondary computer 106 includes a remote graphics client process 110 (referred to herein as the "client process 110") that communicates with a remote graphics server process 108 (referred to herein as the "server process 108") included in the primary computer 102 via the communications link 104. The client process 110 allows a user to remotely connect to the primary computer 102 such that any graphics that is rendered and displayed on the primary computer 102 is transmitted to and displayed on the secondary computer 106.

In operation, the server process 108, when initialized on the primary computer 102, waits until a connection is initiated by the client process 110. When initiating a connection, the client process 110 may transmit additional information such as the resolution of a display device (not shown) coupled to the secondary computer 106. In response to a connection from the client process 110, the server process 108 begins to collect graphics data that was rendered for display on a display device (not shown) coupled to the primary computer 102, compress the graphics data and transmit the compressed graphics data to the client process 110 via the communications link 104. The client process 110 receives compressed graphics data from the server process 108, decompresses the graphics data and displays the decompressed graphics data on the display device coupled to the secondary computer 106. The transmission from the server process 108 to the client process 110 continues until the client process 110 terminates the connection between the server process 108 and the client process 110. In addition, the client process 110 collects inputs, such keyboard key strokes or mouse inputs, at the secondary computer 106 and transmits the inputs to the server process 108. The server process 108 captures the received inputs and causes the inputs to effect the operation of the primary computer 102 or applications executing within the server 102.

The communications link 104 includes a plurality of network communications systems, such as routers and switches, configured to facilitate data communication between the client process 110 and the server process 108. Persons skilled in the art will recognize that many technically feasible techniques exist for building the communications link 104, including technologies practiced in deploying the well-known internet communications network.

The primary computer 102 and the secondary computer 106 may be any type of computing device including, but not limited to, a desktop personal computer (PC), a laptop, a tablet PC, a personal digital assistant (PDA) or a mobile device, such as a mobile phone.

In one embodiment, a plurality of secondary computers, such as the secondary computer 106, can connect to the primary computer 102 simultaneously via corresponding client processes.

Figure 2:
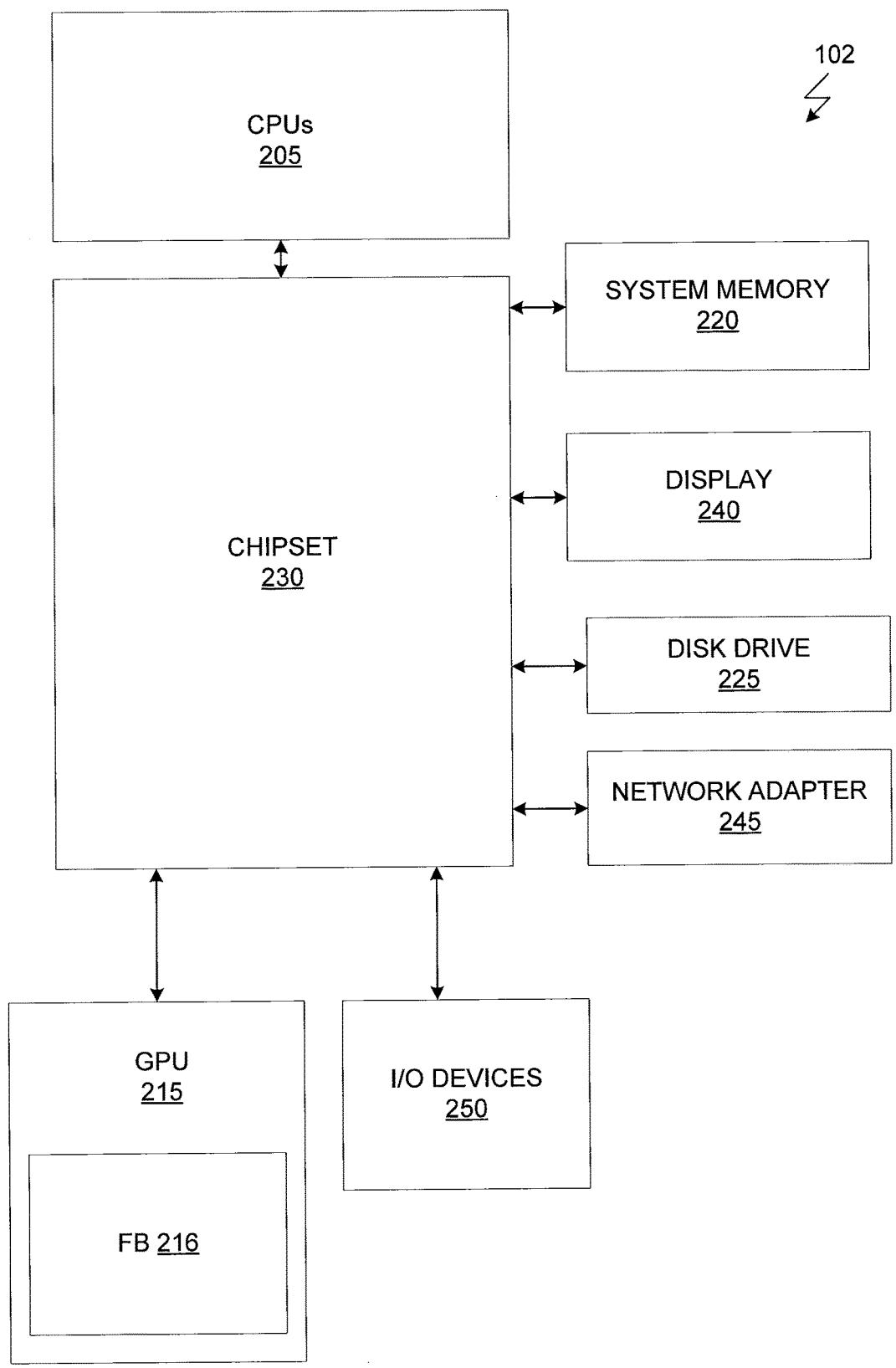
FIG. 2 illustrates a more detailed view of the primary computer of FIG. 1, according to one embodiment of the present invention.

FIG. 2 illustrates a more detailed view of the primary computer 102 of FIG. 1, according to one embodiment of the present invention. As shown, the primary computer 102 includes one or more central processing units (CPUs) 205, a graphics processing unit (GPU) 215, a chipset 230, system memory 220, a disk drive 225, display device 240, network adapter 245 and I/O devices 250 communicatively coupled by one or more busses (not shown). In addition, the GPU 215 includes a frame buffer 216.

The chipset 230 is configured as an input/output hub for communicating data and instructions between the CPU 205, the GPU 215, the system memory 220, the disk drive 225 and the peripheral devices 240, 245 and 250. The peripheral devices 215, 240-265 may include the display device 240, a network adapter (e.g., Ethernet card) 245, CD drive, DVD drive, a keyboard, a pointing device, a speaker, a printer, and/or the like.

In operation, the server process 108 described above executes on the CPU 205 and collects graphics data related to other applications executing on the CPU 205 and rendered by the GPU 215. The collected graphics data is then compressed and transmitted to the client process 110 over the communications link 104 via the network adapter 245. The operation of the server process 108 with respect to collecting, compressing and transmitting the graphics data is described in greater detail below in conjunction with FIGS. 4-5.

Figure 3A:
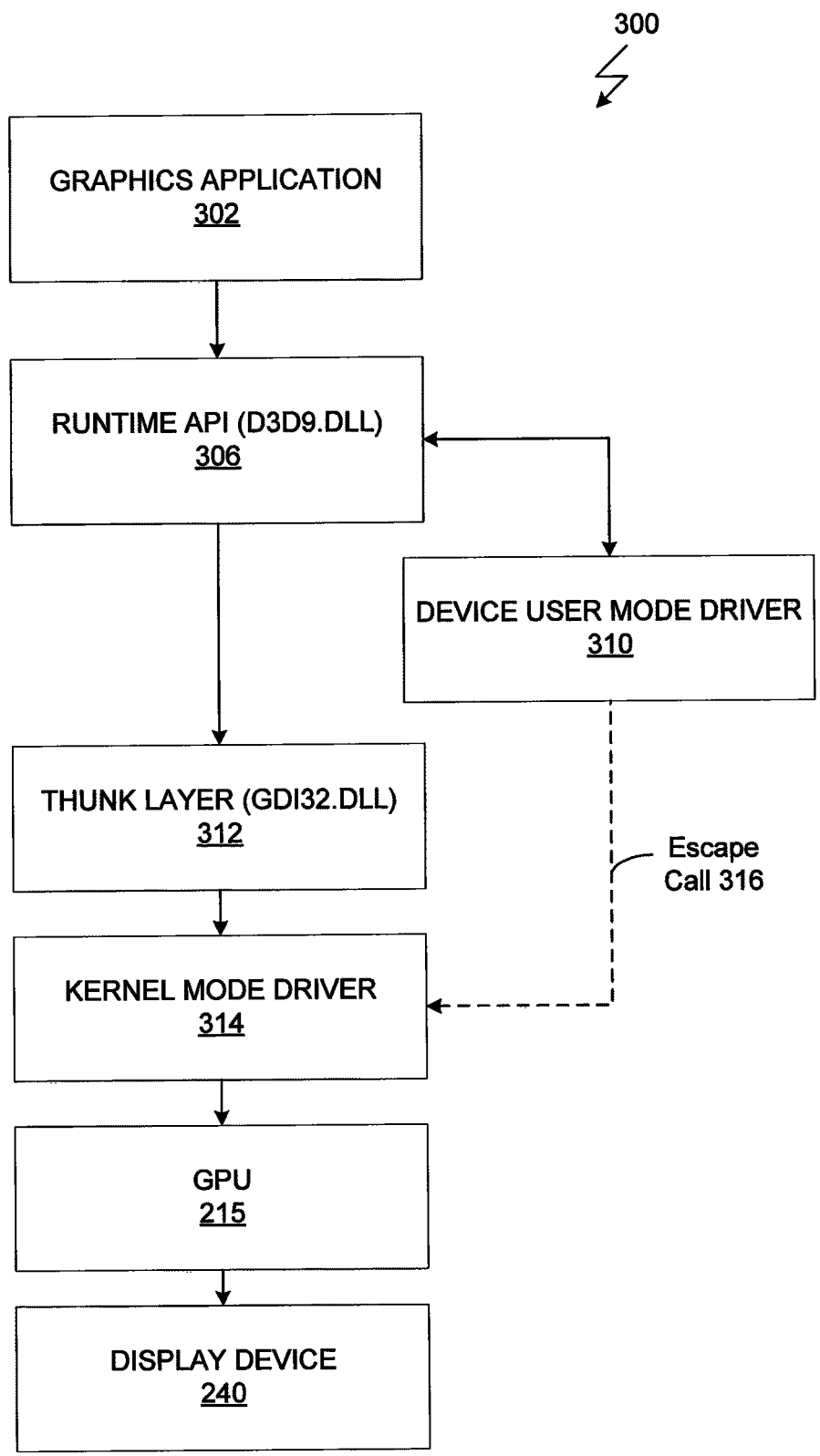
FIG. 3A illustrates a graphics processing stack that includes a graphics application and is implemented by the primary computer of FIG. 2, according to one embodiment of the invention.

FIG. 3A illustrates a graphics processing stack 300 that includes a graphics application 302 and is implemented by the primary computer 102 of FIG. 2, according to one embodiment of the invention. The graphics processing stack 300 includes a runtime application program interface (API) 306, a device user mode driver (UMD) 310, a thunk layer 312, a kernel mode driver (KMD) 314, the GPU 215 and the display device 240.

When the graphics application 302 starts, the graphics application 302 calls the runtime API 306 to determine the display adapters that are available. In response, the runtime API 306 enumerates the graphics adapters that are attached to the primary computer 102, i.e., the GPU 215, and loads the device UMD 310 associated with the GPU 215. The device UMD 310 configures command buffers of the GPU 215 to receive graphics commands from the graphics application 302. The device UMD 310 then calls back to the runtime API 306 when the command buffers have been configured.

Thereafter, the graphics application 302 makes graphics requests for rendering graphics objects to the runtime API 306. The runtime API 306 transmits the graphics requests to the device UMD 310 which configures the command buffers based on the graphics requests. The device UMD 310 then calls, through the thunk layer 312, to the KMD 314 to schedule the graphics requests with the GPU 215 for execution. The GPU 215 renders the graphics objects based on the graphics requests received from the graphics application 302. The rendered graphics objects are stored in rendering buffers within the frame buffer 215. When a present( ) call is received from the graphics application 302, the rendered graphics objects within the rendering buffers are flushed out of the frame buffer 216 and displayed on the display device 240.

To enable the transmission of rendered graphics data associated with the graphics application 302 to the client process 110, the device UMD 310, upon receiving a graphics request from the runtime API 306, makes an escape call 316 to map a pre-determined page of system memory associated with remote graphics into the process. The device UMD 310 also intercepts present( ) calls made by the graphics application 302 to enable the transmission of rendered graphics data to the client process 110 in a manner discussed below.

Figure 3B:
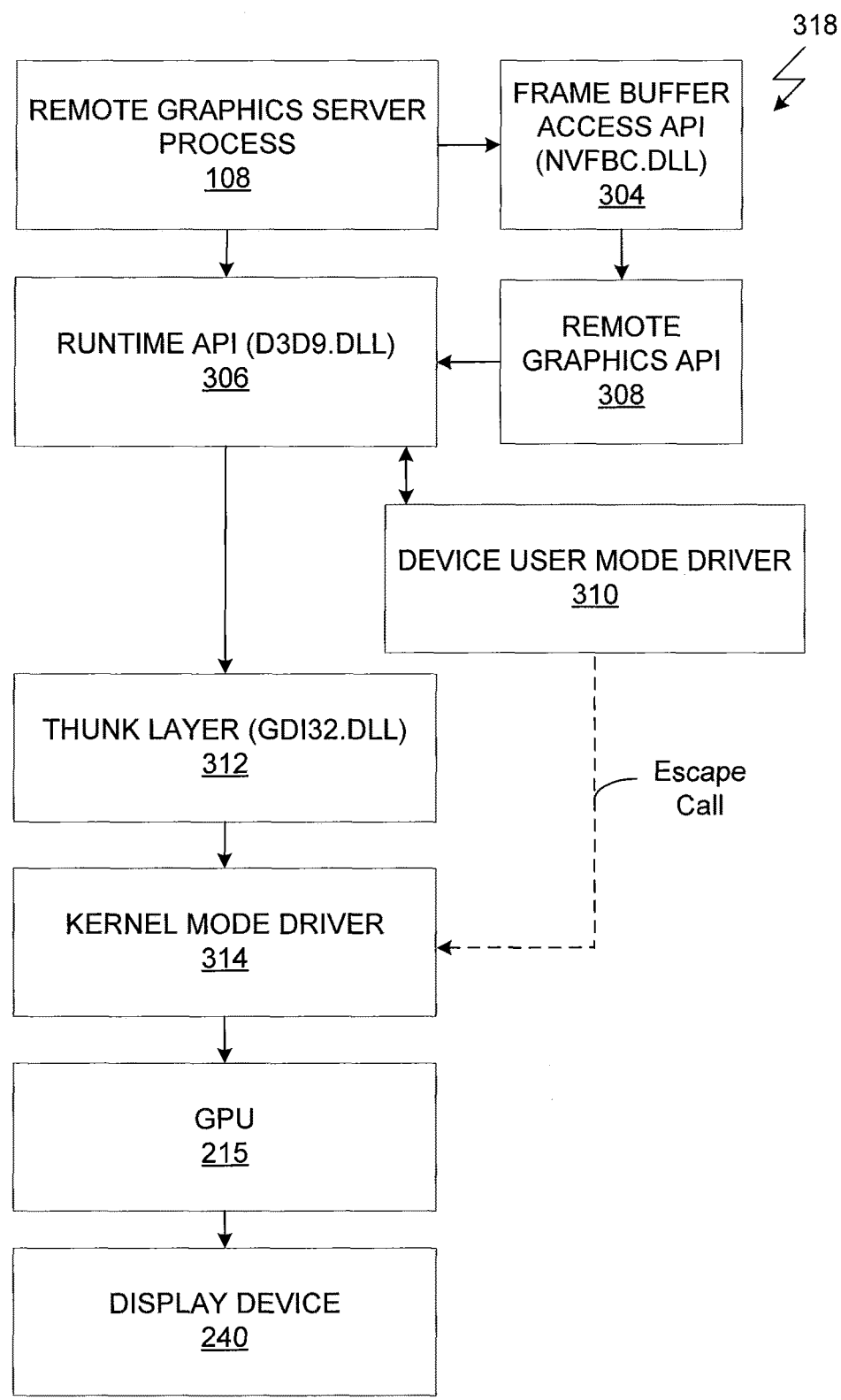
FIG. 3B illustrates a graphics processing stack that includes a remote graphics server process and is implemented by the primary computer of FIG. 2, according to one embodiment of the invention.

FIG. 3B illustrates a graphics processing stack 300 that includes the remote graphics server process 108 and is implemented by the primary computer 102 of FIG. 2, according to one embodiment of the invention. The server process 108 causes the rendered graphics data in the rendering buffers to be collected, scaled/filtered and compressed for transmission. For these operations, the server process 108 uses the frame buffer access API 304, the remote graphics API 308, the instance of the device UMD 310 associated with the remote graphics server process 108 and the KMD 314 in a manner described in greater detail in FIG. 4.

Figure 4:
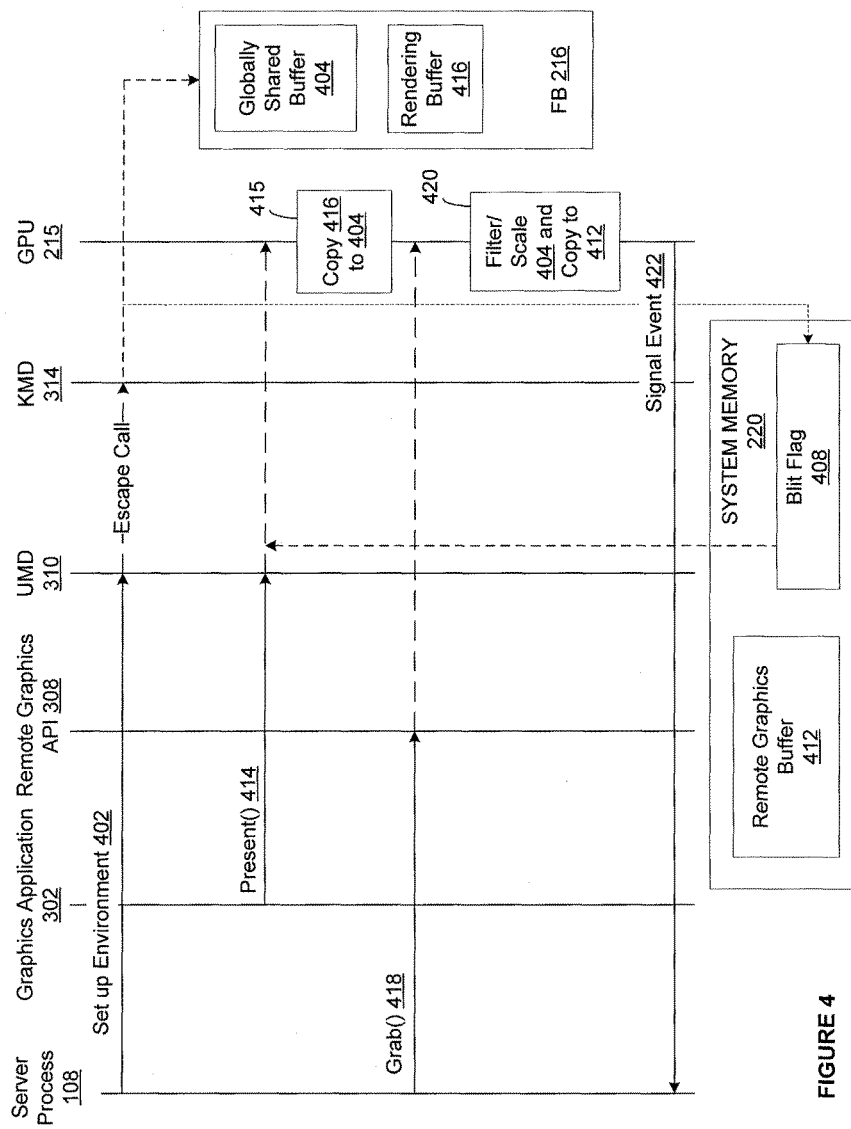
FIG. 4 illustrates a technique that enables the transmission of rendered graphics data to the client process 110, according to one embodiment of the invention.

FIG. 4 illustrates a technique that enables the transmission of rendered graphics data to the client process 110, according to one embodiment of the invention. The technique has three distinct portions. First, setting up a shared buffer to collect rendered graphics data for transmission to the client process 110. Step 402 is directed to the first portion. Second, configuring the GPU 215 to store rendered graphics data in the shared buffer. Steps 414-415 are directed to the second portion. Third, grabbing the rendered graphics data from the shared buffer for transmission to the client process 110. Steps 418-422 are directed to the third portion.

When a connection between the client process 110 and the server process 108 is established, the server process 108, at step 402, transmits a request to the remote graphics API 308 via the frame buffer access API 318 to set up the environment for transmitting rendered graphics data from the shared buffer for transmission to the client process 110. The remote graphics API 308 transmits the request to the instance of the device UMD 310 associated with the server process 108. In response, the device UMD 310 308 performs two operations.

First, the device UMD 310 allocates the remote graphics buffer 412 in the system memory 220 for storing the graphics data to be transmitted to the client process 110. The remote graphics buffer 412 is configured such that a direct memory access operation can be performed by the GPU 215 to transfer data between the frame buffer 216 and the remote graphics buffer 412. Second, the device UMD 310 transmits an escape call to the KMD 314. In response to the escape call, the KMD 314 initializes the globally shared buffer 406 within the frame buffer 216. The globally shared buffer 404 is associated with the server process 108. Also in response to the escape call, the KMD 314 sets the blit flag 408 within the system memory 220 to valid. Each graphics application executing within the primary computer 102, such as graphics application 302, can access the blit flag 408 via the instance of the device UMD 310 associated with the graphics application. When set, the blit flag 408 indicates to the graphics applications that the server process 108 is collecting rendered graphics data for transmission to the client process 110.

At step 414, the graphics application 302 transmits a graphics command stream that includes a present ( ) call to the instance of the device UMD 310 associated with the graphics application 302 for transmission to the GPU 215. The graphics command stream includes one or more commands for rendering graphics data associated with the graphics application 302. The present( ) call that, when processed, causes the rendered graphics data associated with the graphics application 302 to be displayed on the display device 240.

When the graphics command stream includes a present( ) call, the device UMD 310 determines whether graphics data is being collected for transmission to the client process 110. To make such a determination, the device UMD 310 accesses the blit flag 408 to determine if the blit flag 408 is set. Again, when set, the blit flag 408 indicates that the server process 108 is collecting rendered graphics data for transmission to the client process 110. If the device UMD 310 determines that graphics data is being collected for transmission to the client process 110, then the device UMD 310 inserts commands into the graphics command stream that cause the GPU 215 to copy any rendered graphics data generated as a result of the command stream to the globally shared buffer 404 that was initialized by the server process 108 at step 402.

The GPU 215, in response to receiving the graphics command stream, renders the graphics data and stores the rendered graphics data in the rendering buffer 416 included in the frame buffer 216. Further, if the device UMD 310 inserted commands to copy the rendered graphics data to the globally shared buffer 404, then the GPU 215, at step 415, copies the rendered graphics data from the rendering buffer 416 to the globally shared buffer 404 via a blit operation.

At step 418, the server process 108, via the frame buffer access API 318, transmits a request to the remote graphics API 308 to "grab" the rendered graphics data stored in the globally shared buffer 404. The remote graphics API 308, via the device UMD 310, transmits commands to the GPU 215, that, when executed by the GPU 215, causes the GPU 215, at step 420, to perform one or more scaling, filtering or pixel shading operations on the graphics data stored in the globally shared buffer 404. The operations may include scaling the graphics data based on a resolution associated with the secondary computer 106 that was received when the remote graphics connection between the client process 110 and the server process 108 was established. The operations may also include applying a pixel shader to the graphics data to preserve the quality of the graphics data while scaling. Any other technically feasible graphics operation can be performed on the graphics data stored in the globally shared buffer 404.

The resulting graphics data is copied by the GPU 215 to the remote graphics buffer 412 via a direct memory access (DMA) operation. As previously described herein, the remote graphics buffer 402 is configured such that the GPU 215 can directly transfer data to the remote graphics buffer 412 from the frame buffer 216. In one embodiment, the graphics data resulting from the filtering/scaling/shading operations is stored in a temporary buffer before being copied to the remote graphics buffer 412. At step 422, when the GPU 215 completes the DMA operation, the GPU 215 raises an event that is transmitted to the server process 108 and indicates that the DMA operation is complete.

The server process 108 can then optionally perform compression operations on the graphics data stored in the remote graphics buffer 402. The graphics data is then transmitted to the client process 110 via the communications link 104. The client process 110 decompresses the graphics data, and the decompressed graphics data is displayed on a display device (not shown) coupled to the secondary computer 106.

In one embodiment, keystrokes captured by the client process 110 are transmitted to the server process 108. The server process 108, in turn, translates the received keystrokes into commands that modify the behavior of the server computer 102, applications, such as graphics application 302, executing on the server computer 102 or modify the configuration information based on which graphics data is generated for transmission to the client process. For example, a keystroke associated with a hotkey received from the client process 110 may indicate to the server process 108 to modify the type of scaling/filtering/pixel shading operations that are performed on the graphics data rendered by the GPU 215. In one embodiment, graphics data may be cropped to fit the resolution of the display device coupled to the secondary computer 106 instead of being scaled in response to such a keystroke.

In another embodiment, each application has a corresponding channel for transmitting commands to the GPU 215. In such an embodiment, commands that are related to transferring graphics data from the rendering buffer 416 to the globally shared buffer 404 are transmitted by the device UMD 310 over a different channel than the one on which commands for performing one or more filtering/scaling/pixel shading operations on the graphics data in globally shared buffer 404. In such a manner, the graphics application 302 can continue to render additional graphics data without being blocked by commands transmitted by the server process 108. Importantly, such a division allows for the graphics application 302 to continue smoothly without any interruptions even when a connection between the secondary computer 106 and the primary computer 104 is established.

Figure 5:
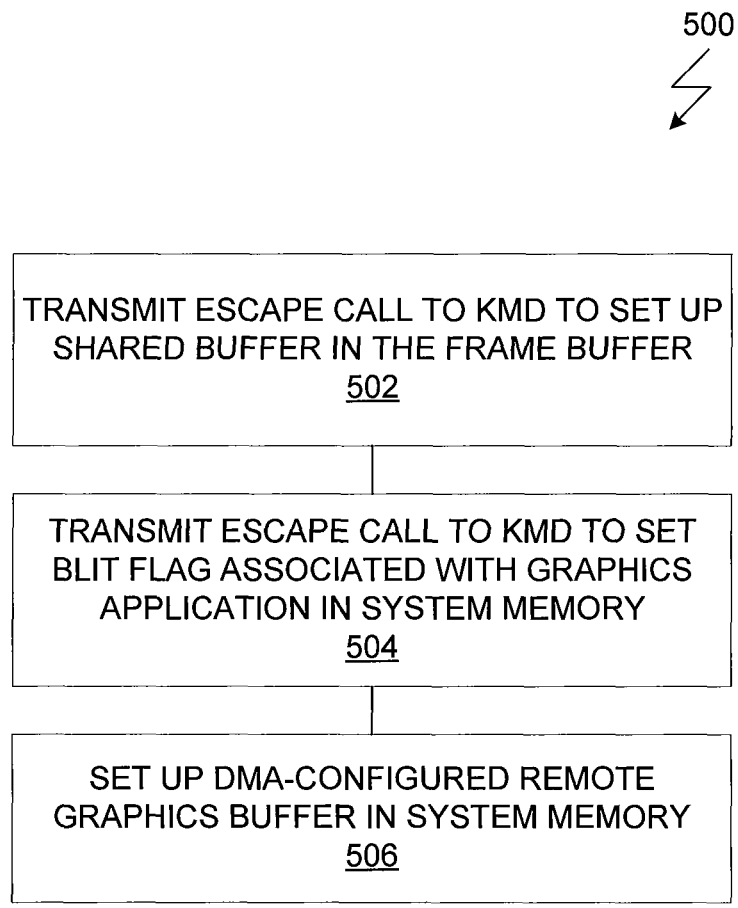
FIG. 5 is a flow diagram of method steps for setting up an environment for transmitting rendered graphics data to a secondary computer, according to one embodiment of the invention.

FIG. 5 is a flow diagram of method steps for setting up an environment for transmitting rendered graphics data to a secondary computer, according to one embodiment of the invention. Although the method steps are described in conjunction with the systems for FIGS. 1-4, persons skilled in the art will understand that any system configured to perform the method steps, in any order, is within the scope of the invention.

The method 500 begins at step 502, where the device UMD 310, in response to receiving a request from the server process 108 via the remote graphics API 308, the device UMD 310 transmits an escape call to the KMD 314. In response to the escape call, the KMD 314 initializes the globally shared buffer 406 within the frame buffer 216.

At step 504, the device UMD 310, in response to receiving a request from the server process 108 via the remote graphics API 308, the device UMD 310 transmits an escape call to the KMD 314. In response to the escape call, the KMD 314 sets the blit flag 408 within the system memory 220 to valid. Again, each graphics application executing within the primary computer 102, such as graphics application 302, can access the blit flag 408 via the instance of the device UMD 310 associated with the graphics application. When set, the blit flag 408 indicates to the graphics applications that the server process 108 is collecting rendered graphics data for transmission to the client process 110. In one embodiment, the same escape call causes the KMD 314 to initialize the globally shared buffer 406 and set the blit flag 408.

At step 506, the device UMD 310 allocates the remote graphics buffer 412 in the system memory 220 for storing the graphics data to be transmitted to the client process 110. The remote graphics buffer 412 is configured such that a direct memory access operation can be performed by the GPU 215 to transfer data between the frame buffer 216 and the remote graphics buffer 412.

Figure 6:
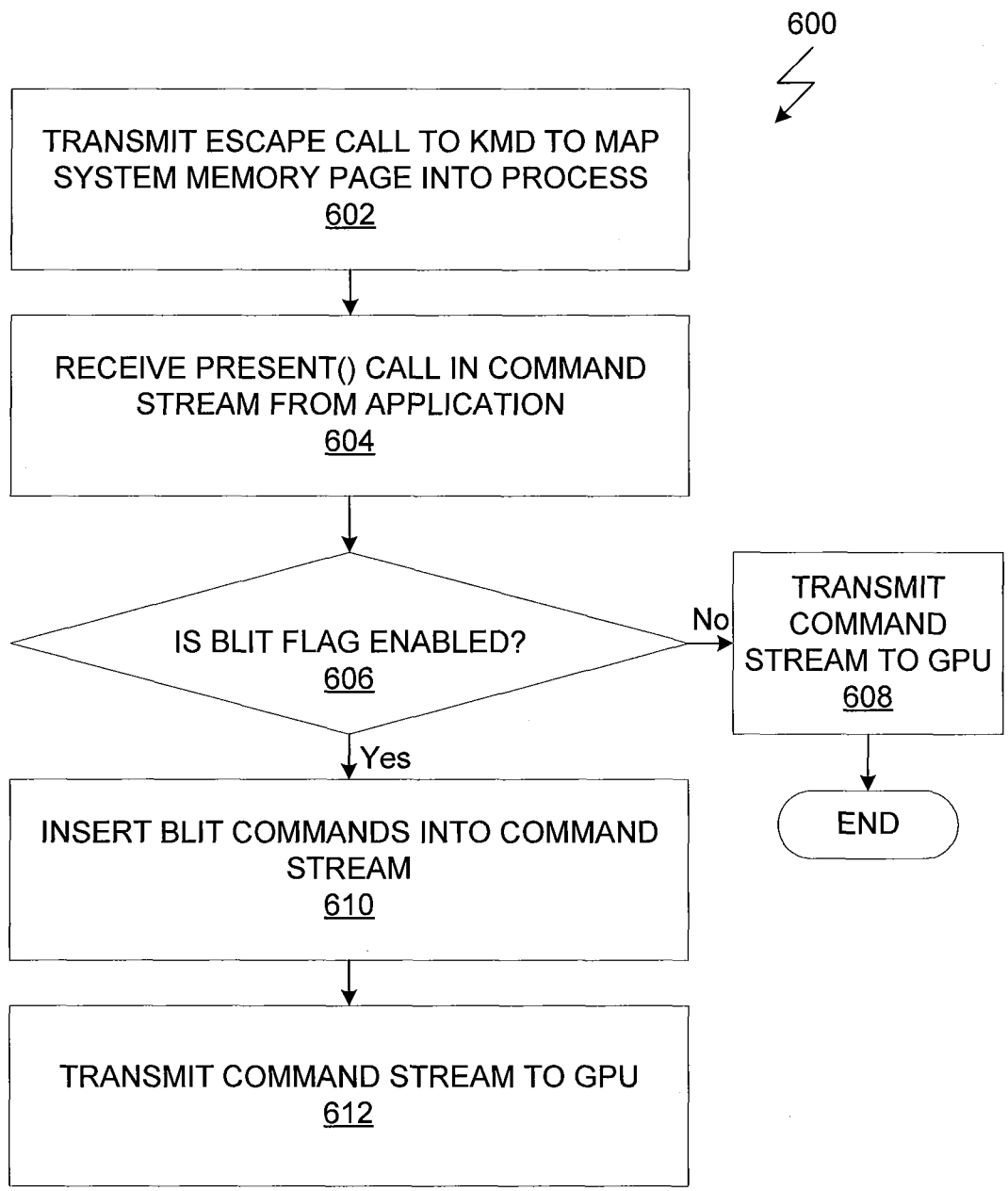
FIG. 6 is a flow diagram of method steps for capturing rendered graphics data in globally shared buffer, according to one embodiment of the invention.

FIG. 6 is a flow diagram of method steps for capturing rendered graphics data in globally shared buffer, according to one embodiment of the invention. Although the method steps are described in conjunction with the systems for FIGS. 1-4, persons skilled in the art will understand that any system configured to perform the method steps, in any order, is within the scope of the invention.

The method 600 begins at step 602, where the device UMD 310 transmits an escape call to the KMD 314 to map a control page within the system memory 220 into the process. The control page includes the blit flag 408 and is a mechanism via which the server process 102 and the graphics application 302 can communicate.

At step 604, the device UMD 310 receives a graphics command stream that includes a present( ) call from the graphics application 302. At step 606, the device UMD 310 determines whether graphics data is being collected for transmission to the client process 110. In one embodiment, the device UMD 310 makes such a determination by accessing the blit flag 408 to determine if the blit flag 408 is set.

If graphics data is not being collected for transmission to the client process 110, then the method 600 proceeds to step 608, where the graphics command stream is transmitted to the GPU 215 for processing. If, however, graphics data is being collected for transmission to the client process 110, then the method 600 proceeds to step 610, where the device UMD 310 inserts commands into the graphics command stream that cause the GPU 215 to copy any rendered graphics data generated as a result of the command stream to the globally shared buffer 406. At step 612, the device UMD 310 transmits the command stream to the GPU 215.

Figure 7:
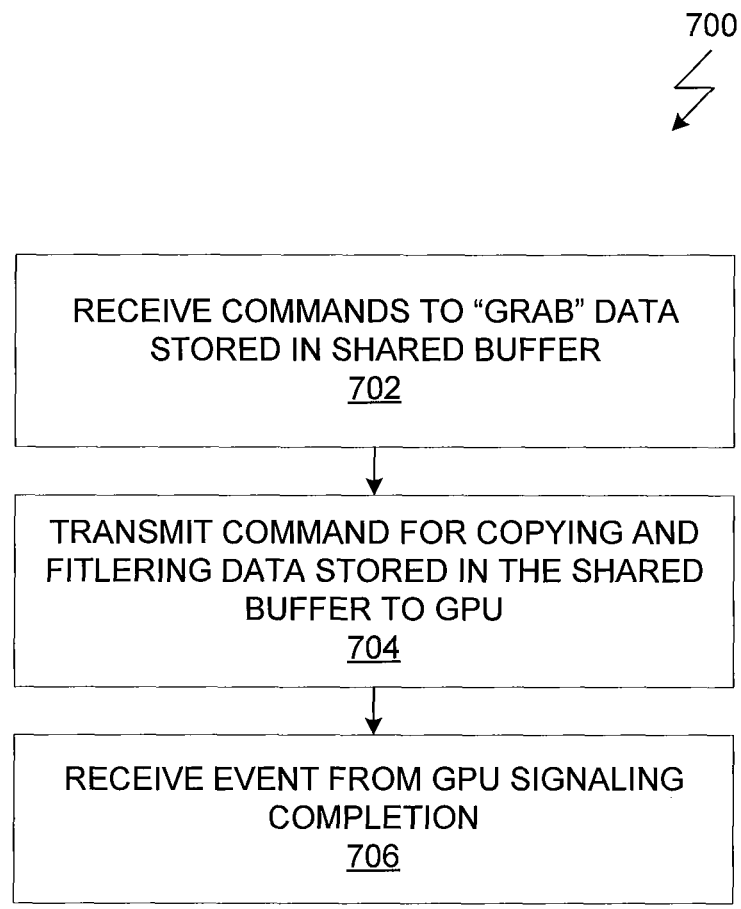
FIG. 7 is a flow diagram of method steps for collecting rendered graphics data from the globally shared buffer for transmission to a secondary computer, according to one embodiment of the invention.

FIG. 7 is a flow diagram of method steps for collecting rendered graphics data from the globally shared buffer for transmission to a secondary computer, according to one embodiment of the invention. Although the method steps are described in conjunction with the systems for FIGS. 1-4, persons skilled in the art will understand that any system configured to perform the method steps, in any order, is within the scope of the invention.

The method 700 begins at step 702, where the remote graphics API 308 receives a request from the server process 108 to "grab" graphics data stored in the globally shared buffer 406 for transmission to the client process 102. At step 704, the remote graphics API 308, via the device UMD 310, transmits commands to the GPU 215, that, when executed by the GPU 215, causes the GPU 215, at step 420, to perform one or more scaling, filtering or pixel shading operations on the graphics data stored in the globally shared buffer 404. The remote graphics API 308, via the device UMD 310, also transmits commands to the GPU 215 that cause the GPU 215 to copy the processed data to the remote graphics buffer 412 via a direct memory access (DMA) operation. At step 706, when the GPU 215 completes the DMA operation, the remote graphics API 308 receives an event from the GPU signaling the completion of the DMA operation. Once the data is stored in the remote graphics buffer 412, the server process 108 is able to transmit the data from the remote graphics buffer 412 to the client process 110 on the secondary computer.

Advantageously, the technique for collecting and transmitting graphics data to the secondary computer 106 described herein allows for a smooth transition when the client process 110 connects to or disconnects from the server process 108 as the behavior of the primary computer 102 and applications executing within the primary computer 102 are not modified. In addition, because the commands for generating and collecting graphics data and modifying the graphics data for transmission are transmitted to the GPU 215 on different channels, the operation of graphics application 302 is not slowed down or stalled by the operation of the server process 108. Lastly, because the GPU 215 is able to perform a DMA operation to transfer graphics data to system memory, the performance of the server computer 102 is not impacted based on such a transfer.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

I claim:

1. A computing device-implemented method for transmitting data rendered on a primary computing device to a secondary computing device, the method comprising:
   transmitting to a graphics processing unit (GPU) included within the primary computing device a first graphics processing command received from a graphics application executing on the primary computing device, wherein the first graphics processing command is configured to cause the GPU to render a first set of graphics data based on a resolution associated with the primary computing device;
   determining that graphics data should be collected for transmission to the secondary computing device;
   conveying to the GPU that the first set of graphics data should be stored in a first buffer within a frame buffer memory coupled to the GPU;
   transmitting to the GPU a second graphics processing command that is configured to cause the GPU to perform one or more operations on the first set of graphics data stored in the first buffer to generate a second set of graphics data, wherein the one or more operations comprise a scaling operation that causes the first set of graphics data to be modified based on a resolution associated with the secondary computing device; and
   causing the GPU to transmit the second set of graphics data to a second buffer within a system memory coupled to the GPU for transmission to the secondary computing device.

2. The method of claim 1, wherein determining that graphics data should be collected for transmission to the secondary computing device comprises accessing a flag stored in the system memory that has been set by the graphics application.

3. The method of claim 1, wherein the GPU stores the second set of graphics data in a third buffer within the frame buffer memory prior to transmitting the second set of graphics data to the second buffer.

4. The method of claim 1, wherein the second buffer is configured to be directly accessible by the GPU, and the GPU is configured to transmit the second set of graphics data to the second buffer via a direct memory access (DMA) operation.

5. The method of claim 4, further comprising transmitting to the process application an event raised by the GPU indicating that the DMA operation has been completed.

6. The method of claim 4, wherein the process application is configured to compress the second set of graphics data stored in the second buffer and transmit the compressed data to the secondary computing device.

7. The method of claim 1, wherein the one or more operations further comprise a pixel shading operation that is configured to preserve the quality of the first set of graphics data after the first set of graphics data has been modified.

8. The method of claim 1, wherein the first graphics processing command is transmitted to the GPU via a first channel, and the second graphics processing command is transmitted to the GPU via a second channel, and wherein the execution of commands received via the second channel does not interfere with the execution of commands received via the first channel.

9. A non-transitory computer readable medium storing instructions that, when executed by a processor, cause the process to transmit data rendered on a primary computing device to a secondary computing device, by performing the steps of:
   transmitting to a graphics processing unit (GPU) included within the primary computing device a first graphics processing command received from a graphics application executing on the primary computing device, wherein the first graphics processing command is configured to cause the GPU to render a first set of graphics data based on a resolution associated with the primary computing device;
   determining that graphics data should be collected for transmission to the secondary computing device;
   conveying to the GPU that the first set of graphics data should be stored in a first buffer within a frame buffer memory coupled to the GPU;
   transmitting to the GPU a second graphics processing command that is configured to cause the GPU to perform one or more operations on the first set of graphics data stored in the first buffer to generate a second set of graphics data, wherein the one or more operations comprise a scaling operation that that causes the first set of graphics data to be modified based on a resolution associated with the secondary computing device; and
   causing the GPU to transmit the second set of graphics data to a second buffer within a system memory coupled to the GPU for transmission to the secondary computing device.

10. The non-transitory computer readable medium of claim 9, wherein determining that graphics data should be collected for transmission to the secondary computing device comprises accessing a flag stored in the system memory that has been set by the graphics application.

11. The non-transitory computer readable medium of claim 9, wherein the GPU stores the second set of graphics data in a third buffer within the frame buffer memory prior to transmitting the second set of graphics data to the second buffer.

12. The non-transitory computer readable medium of claim 9, wherein the second buffer is configured to be directly accessible by the GPU, and the GPU is configured to transmit the second set of graphics data to the second buffer via a direct memory access (DMA) operation.

13. The non-transitory computer readable medium of claim 12, further comprising transmitting to the process application an event raised by the GPU indicating that the DMA operation has been completed.

14. The non-transitory computer readable medium of claim 12, wherein the process application is configured to compress the second set of graphics data stored in the second buffer and transmit the compressed data to the secondary computing device.

15. The computer non-transitory readable medium of claim 9, wherein the one or more operations further comprise a pixel shading operation that is configured to preserve the quality of the first set of graphics data after the first set of graphics data has been modified.

16. The non-transitory computer readable medium of claim 9, wherein the first graphics processing command is transmitted to the GPU via a first channel, and the second graphics processing command is transmitted to the GPU via a second channel, and wherein the execution of commands received via the second channel does not interfere with the execution of commands received via the first channel.

17. A computer system, comprising:
a system memory;
a graphics processing unit (GPU) coupled to a frame buffer memory and the system memory; and
a central processing unit (CPU) coupled to the GPU and the system memory, wherein the CPU is configured to:
transmit to the GPU a first graphics processing command received from a graphics application executing on the CPU, wherein the first graphics processing command is configured to cause the GPU to render a first set of graphics data based on a resolution associated with a primary computing device,
determine that graphics data should be collected for transmission to a secondary computing device,
convey to the GPU that the first set of graphics data should be stored in a first buffer within the frame buffer memory coupled to the GPU,
transmit to the GPU a second graphics processing command that is configured to cause the GPU to perform one or more operations on the first set of graphics data stored in the first buffer to generate a second set of graphics data, wherein the one or more operations comprise a scaling operation that causes the first set of graphics data to be modified based on a resolution associated with the secondary computing device, and
cause the GPU to transmit the second set of graphics data to a second buffer within the system memory for transmission to the secondary computing device.

18. The computer system of claim 17, wherein determining that graphics data should be collected for transmission to the secondary computing device comprises accessing a flag stored in the system memory that has been set by the graphics application.

* * * * *